United States Patent

[11] 3,630,409

[72] Inventor William Lovell Robinson
 Northolt, England
[21] Appl. No. 8,296
[22] Filed Feb. 3, 1970
[45] Patented Dec. 28, 1971
[73] Assignee Electric Shop Developments Limited
 London, England
[32] Priority Feb. 4, 1969
[33] Great Britain
[31] 6,026/69

[54] DISPENSER HAVING A CONVEYOR BELT FORMING A PLURALITY OF DELIVERY SECTIONS
 6 Claims, 5 Drawing Figs.
[52] U.S. Cl. .................................................. 221/18,
 198/108, 221/18
[51] Int. Cl. .................................................. B65h 7/04
[50] Field of Search........................................... 221/18,
 103, 104, 106, 110, 119, 133, 260; 198/108

[56] References Cited
 UNITED STATES PATENTS
 3,094,241 6/1963 Lashley ..................... 221/260 X
 2,441,519 5/1948 Terhune ..................... 221/260 X Primary Examiner—Samuel F. Coleman
Assistant Examiner—David A. Scherbel
Attorney—Bacon & Thomas ABSTRACT: Apparatus for dispensing articles having a conveyor belt forming a plurality of delivery sections arranged such that only one delivery section at a time moves to dispense articles when the conveyor belt is driven.

Patented Dec. 28, 1971

INVENTOR
WILLIAM LOVELL ROBINSON
BY
Bacon & Thomas
ATTORNEYS

INVENTOR
WILLIAM LOVELL ROBINSON

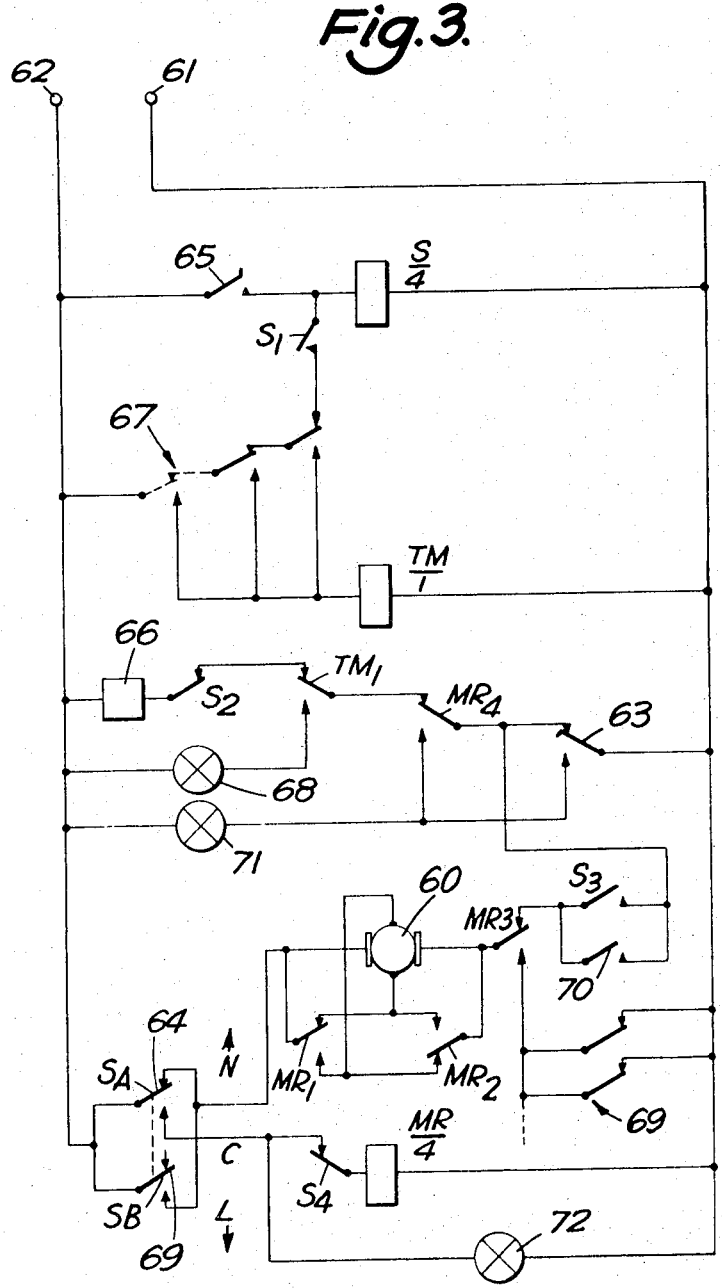

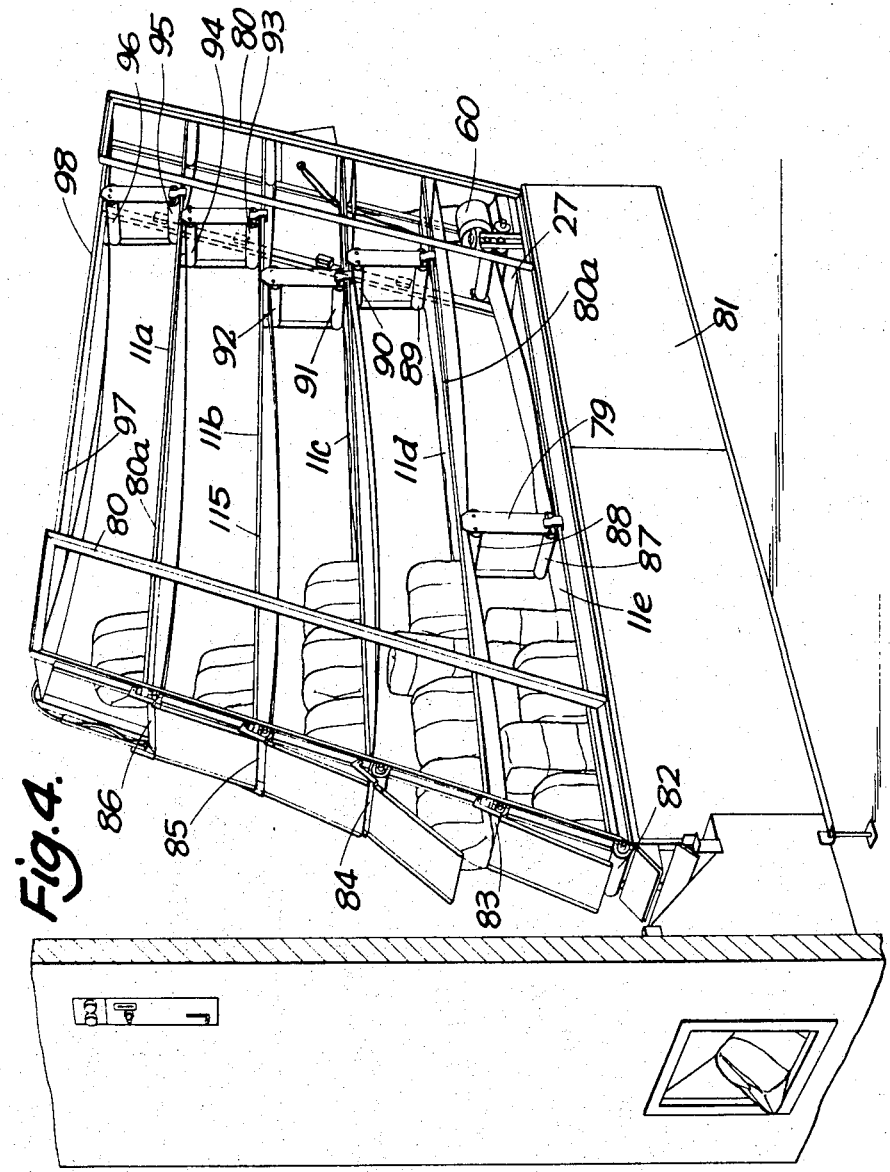

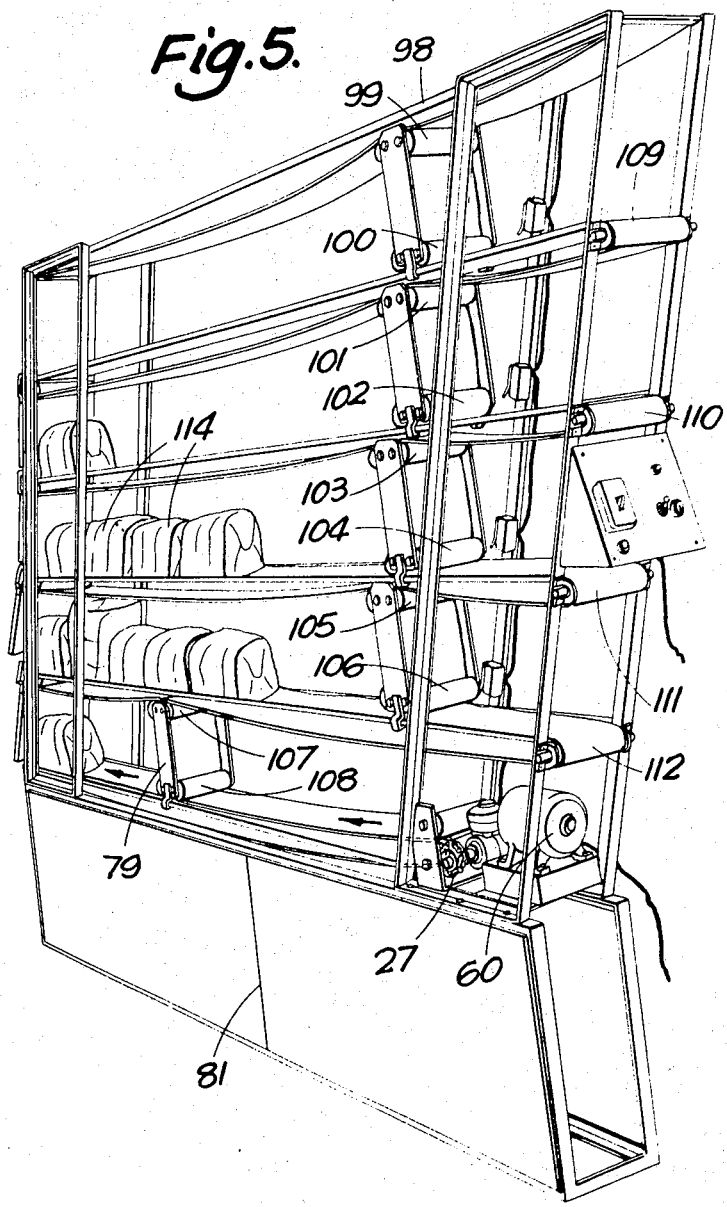

DISPENSER HAVING A CONVEYOR BELT FORMING A PLURALITY OF DELIVERY SECTIONS

The invention relates to apparatus for dispensing articles and is particularly but not exclusively suitable for inclusion within a vending machine which vends bulky articles.

SUMMARY OF THE INVENTION

The invention provides apparatus for dispensing articles which apparatus comprises an elongate conveying member for the articles to be dispensed, a drive for the conveying member, the conveying member being anchored at both ends and arranged to pass under and over a plurality of supports thereby providing a plurality of delivery sections such that only one delivery section at a time moves to dispense articles to be dispensed when the conveyor member is driven.

The conveying member may be a canvas belt and the supports, rotatable smooth rollers, alternatively the conveying member may be a chain and the supports, rotatable sprockets.

Advantageously the conveyor member, between a first delivery section and one end passes under and over a plurality of alternately fixed and movable rotatable supports and the conveyor member contains a loop, between each of the remaining delivery sections, each loop passing around a respective rotatable support which is linked for movement with a respective on of the said movable rotatable supports.

Advantageously each linked pair of rotatable supports is movable along a guide path provided by adjacent members, each pair of supports in turn tranversing along its guide path in response to driving of the conveying member until a stop is reached whereupon another pair of rotatable supports traverses its guide path.

Preferably the conveying member conveys articles from the respective delivery section into a chute to be dispensed and conveniently the article dispensed into the chute operates stopping means for stopping the conveyor member.

First and second switches may be provided associated with the guide path associated with the last delivery section such that a corresponding last pair of rotatable supports operates the first switch to override the action of the stopping means until the last article has been delivered and such that the said last pair of supports subsequently operates the said second switch thereby stopping the movement of the conveyor member.

Advantageously the second switch is positioned before the stop for the guide path associated with the last delivery section so that the second switch is operated by the supports before the stop is reached.

IN THE DRAWING

A specific example of the dispensing apparatus embodying the invention will now be described by way of example and with reference to the accompanying drawings, in which:

FIG. 3 shows diagrammatically the details of the circuit diagram employed in the apparatus; and FIGS. 4 and 5 are perspective views of a separate embodiment of the invention.

DETAILED DESCRIPTION OF THE PREFERRED EMBODIMENTS

Figure 1:
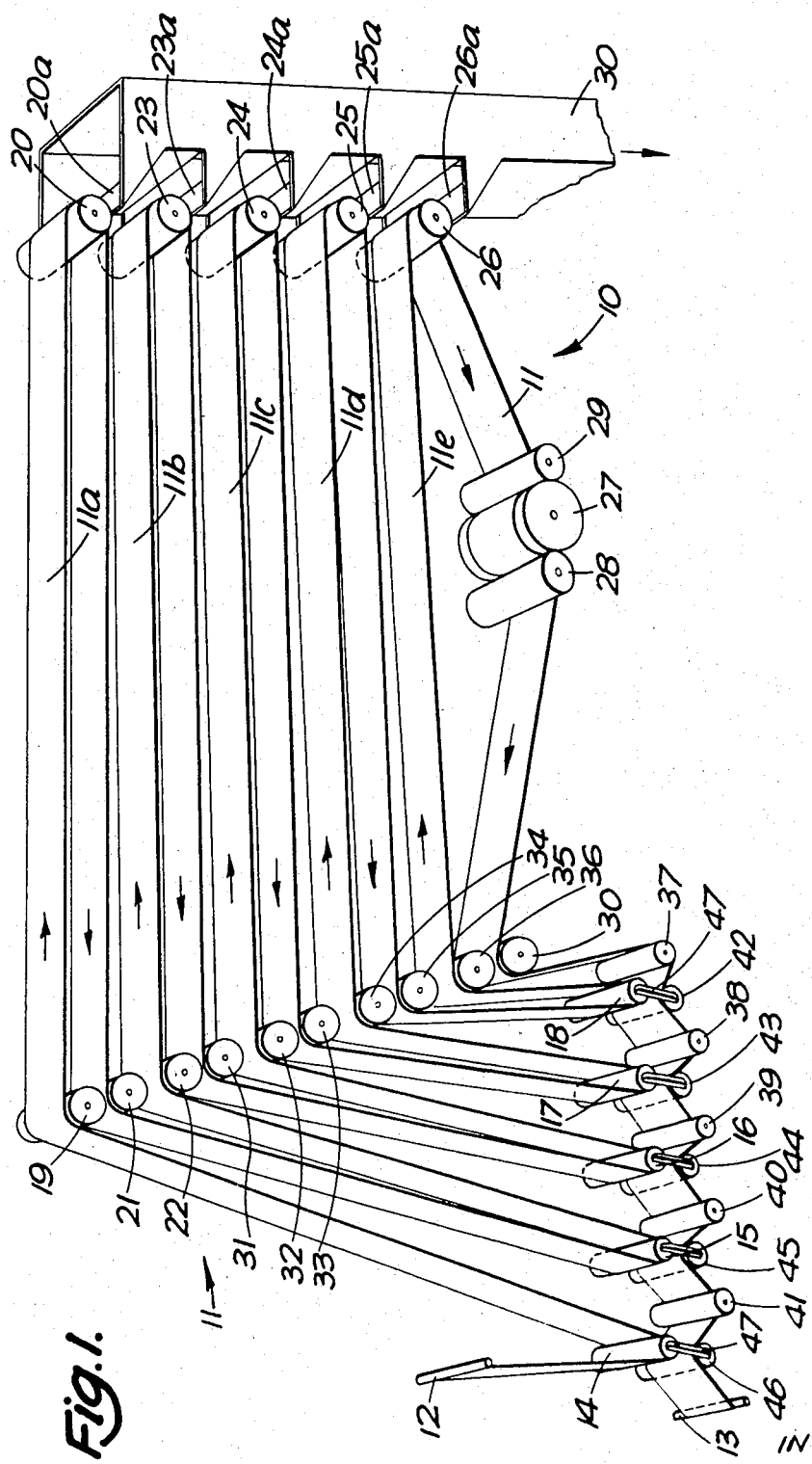
FIG. 1 is a side view of part of the apparatus of this example.

Referring to FIG. 1, the dispensing apparatus is contained within a vending machine 10 which has an elongate conveying member formed by a continuous length of conveyor belt 11. The conveyor belt is anchored at both ends at anchorage points 12 and 13 and is arranged to pass under and over a plurality of supports. The conveyor belt 11 may be a canvas or nylon belt and the supports rotatable smooth rollers or alternatively the conveyor belt may be a chain and the supports rotatable sprockets.

Thus, from the anchorage point 12, the belt 11 passes under a movable roller 14, over a fixed roller 19 and around another fixed roller 20, to form a movable delivery section 11a.

After passing around the fixed roller 20, the belt returns under the delivery section 11a, passes over a fixed roller 21, under a movable roller 15 and back over a fixed roller 22 thereby forming a loop of belt. The belt then passes around a fixed roller 23 to form a further movable delivery section 11b. A plurality of similar delivery sections 11c, 11d and 11e are similarly formed by the belt 11 passing under movable rollers 16–18 and over fixed rollers 24–26, 31–36. After passing around the fixed roller 26, the belt 11 is kept in contact with about half the circumference of the drum 27 by means of two idler rollers 28 and 29.

The remainder of the belt 11 passes over a fixed roller 30, and then passes alternately under and over five fixed and five movable rollers 37–41 and 42–46 respectively before reaching anchorage point 13.

Each of the five pairs of movable rollers 14,46; 15,45; 16,44; 17,43; 18,42 has a link 47 which connects each roller of the pair together whilst still enabling each roller to rotate individually.

Adjacent the end of each of the delivery sections 11a to 11e passing over the fixed rollers 20 to 26 are plates 20a, 23a to 26a, the plates being so positioned that any article falling from the end of any of the delivery section strikes the corresponding plate. The plates 20a, 23a to 26a are spring biased away from pressure sensitive stopping means formed by trip switches 67 (FIG. 3) positioned beneath each plate. When the article strikes the corresponding plate, the plate is depressed against the bias of the spring, thereby contacting and operating the corresponding trip switch 67 to switch off the electric motor 60.

In use, articles to be supplied by the vending machine are placed at regular intervals on each of the delivery sections 11a to 11e. When the electric motor 60 is actuated by inserting a coin into the machine the electric motor 60 drives the drum 27 in an anticlockwise direction to move the first deliver section 11e from left to right as shown in FIG. 1.

The movement of the delivery section 11e carries the article placed thereon towards the right-hand end of the delivery section until the article falls into a delivery chute 30. As the article falls from the delivery section 11e into the chute 30 it strikes the plate 26a to operate one of the corresponding trip switches 67 and switch off the electric motor 60. This sequence of events is repeated each time that the machine is actuated by the insertion of a coin.

Figure 2:
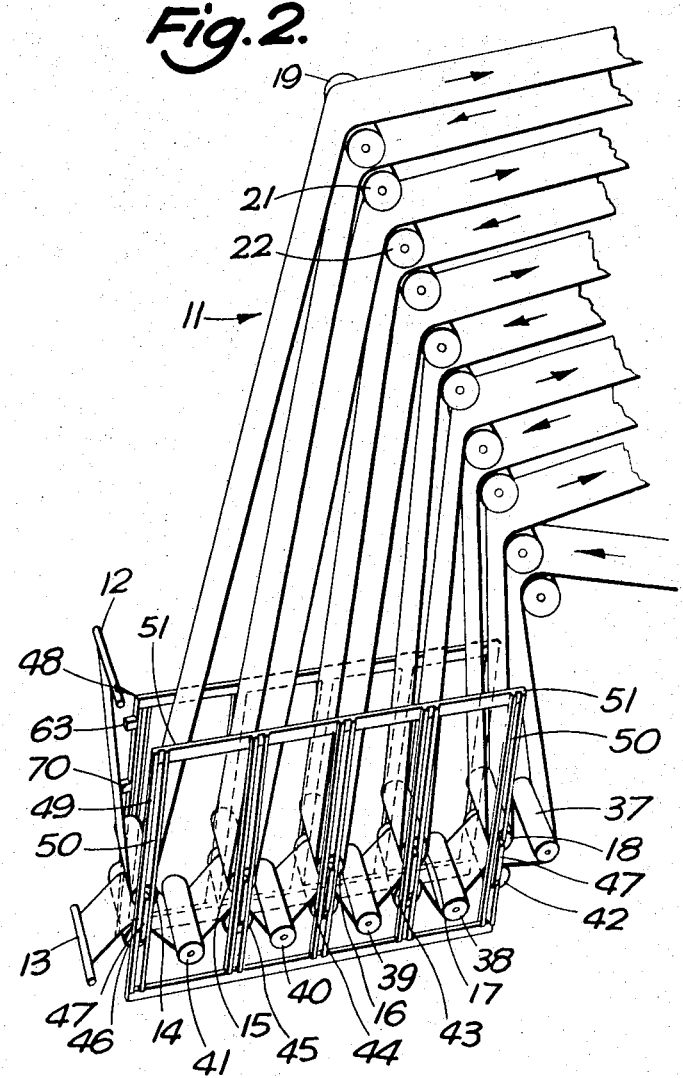
FIG. 2 is a side view of part of FIG. 1 shown in greater detail.

A framework generally indicated at 48 (as shown in FIG. 2) is comprised of members consisting of metal struts 49 which provide guide paths 50 for each linked pair of rollers. When the belt 11 is driven each pair of rollers and the link connected thereto are drawn upwards in turn traversing along its respective guide path 50 until each link 47 strikes a stop on the upper part 51 of the framework to limit further traversing upwards movement.

As the first delivery section 11e (as shown in FIG. 1) moves from left to right in response to the driving of motor 60 the movable roller 18 and the roller 42 linked thereto are drawn upwards.

The upward movement of the movable rollers 18, 42 accommodates the length of belt which moves from right to left under the delivery section 11e, to form a lengthening inverted U-shaped loop of belt between the fixed rollers 37, 38 and the movable roller 42.

When the link 47 associated with the rollers 18, 42 strikes the stop on the upper part 51 of the framework corresponding to the position when all the articles on the delivery section 11e have been delivered, the delivery section 11d and the length of belt 11 underneath it begin to move for the delivery of articles from the section 11d. The movement of the section 11d and the length of belt 11 underneath it are taken up by the upward movement of movable rollers 17 and 43. The upper part 51 of the metal framework acts as the stop to limit the traversing upwards movement of the rollers 17, 43. Each delivery section of the vending machine 10 is emptied in succession.

It is important to ensure that the vending machine 10 is able to successfully vend the last article placed on the machine and is also able to prevent the further insertion of coins when the last article has been dispensed. Accordingly, a predetermined separate section of the last delivery section 11a is arranged to contain only one article, i.e. a last article. When a coin is inserted for the last article the predetermined last delivery section starts to move in order to vend the article, however, before the last article operates the corresponding trip switch 67, a last article switch 70, conveniently a microswitch, is operated by the upward traverse of the link 47 connected to rollers 14, 46 to override the action of the trip switch 67, even though the trip switch 67 is operated, to keep the motor 60 running.

The motor 60 continues to run until a second switch 63 is operated by the continuously rising link 47 connected to rolls 14, 46 to disconnect the motor circuit to stop the motor 60 and also to light a lamp 71 (FIG. 3) to signify that the vending machine 10 is empty. The operation of the second switch 63 is arranged to occur before the rising link reaches the stop of the upper part of the framework 51 thereby preventing the belt from stopping abruptly and hence reducing the strain on the belt. The operation of the second switch 63 also deenergizes a coil lockout in order to prevent the further insertion of coins.

Also the apparatus may be arranged so that a bonus of an extra article may be dispensed at, for example, every fifth or tenth delivery of an article as desired. This multiple deliver can be provided by altering the position of the stops 51 of the framework. If, for example the stop corresponding to rolls 18, 42 is so arranged that the link 47 of the rolls strikes the stop immediately before the last article is dispensed from delivery section 11e, then the insertion of the next coin will cause the last article from delivery section 11e to be disposed together with the first article from delivery section 11d. The positioning of the stop enables the bonus to be increased or decreased as desired.

When all the articles may been vended (or at any desired earlier time), the electric motor 60 can be reversed to drive the drum 27 in a clockwise direction thereby reversing all the movements of the belt 11 previously described, in order to prepare the delivery sections 11a to 11e for loading with more articles.

The electrical control means which control the operation of the vending machine 10 are shown in FIG. 3 and will now be described in further detail. The control means contains two electrical supply terminals 61, 62. When the electrical supply is applied across the terminals 61, 62 and switches S2, TM1, and microswitch 63 are connected as shown in FIG. 3, a coin lockout 66 is energized to that coins may be inserted. In this idling condition the insertion of a coin starts the operation of the machine.

The inserted coin momentarily operates a coin microswitch 65 so that a relay S/4 is momentarily energized The relay S/4 operates thereby closing its holding switch S1. Since all the trip switches 67 are closed the closing of the holding switch allows the relay S/4 to remain energized.

The energization of the relay S/4 also causes the switches S2, S4 to open and switch S3 to close.

The opening of switch S2 causes the coin lockout coil 66 to be deenergized so that no further coins can be inserted. Also, the opening of switch S4 deenergizes relay MR/4 to prevent the operation of this relay to reverse the direction of the motor 60. Thus the opening of switch S4 prevents the motor 60 being reversed whilst an article is being vended. The closing of switch S3 permits a circuit to be completed from the electrical supply to the motor 60 through switches S1, MR3, and the microswitch 63, thereby applying the electrical supply to the motor 60. The motor 60 is actuated and drives one of the respective delivery sections 11a to 11e to vend articles. When an article drops from the end of the respective delivery section to be vended it strikes the plate below that delivery section to operate one of the trip switches 67. The operation of one of the trip switches 67 causes the holding switch S1 to be opened and relay S/4 to be deenergized. The deenergization of relay S/4 causes switch S3 to open disconnecting the electrical supply from the motor 60, thereby stopping the motor 60. Switch S2 closes so that the coin lockout 66 is energized, thus allowing coins to be again inserted into the vending machine 10. Switch S4 also closes so that the motor 60 of the vending machine may again be reversed as desired.

The insertion of a coin thus causes the respective delivery section to move, and the vending of the article causes one of the trip switches 67 to operate to stop the motor 60 from running and return the vending machine to the idling condition.

When the last article is to vended the link 47 connecting rollers 14, 46 operates and closes the last article switch 70 before the trip switch 67 is operated. The motor 60 thus continues to run in spite of switch S3 opening in response to the deenergizing of relay S/4 by the tripping of trip switch 67 by the vending of the last article. The link 47 continues to rise until it strikes microswitch 63, whereupon the position of microswitch 63 is reversed to disconnect the motor circuit and light a lamp 71 indicating that the vending machine is empty. Also the reversing of switch 63 causes the coin lockout 66 to be deenergized so that no further coins can be inserted.

When any one of the trip switches 67 operates, a circuit is connected to trip monitor relay TM/1 to energize momentarily that relay. Energization of relay TM/1 causes switch TM1 to operate to light a trip alarm lamp 68 to indicate that an article is being vended. The operation of switch TM1 also acts to maintain the coin lockout coil 66 momentarily in a deenergized condition so that coins cannot be inserted into the machine whilst an article is being vended.

During normal operation of the vending machine 10 switch SA is connected to terminal 64 and switch SB is connected to terminal 69 (i.e. an inoperative position). Switches S- and SB are ganged together so that operation of switch SA simultaneously operates switch SB.

When it is desired to reload the machine with articles the switches SA and SB are moved to the opposing positions from that shown in FIG. 3. When switch SA is switched away from terminal 64 and is connected to the center position, a loading lamp 72 is lit signifying that a loading operating is being carried out and the motor relay MR/4 is energized. Energization of motor relay MR/4 causes contacts MR1 and MR2 to reverse the connections to motor 60. Contact MR3 also reverses to switch into the circuit loaded switches, generally indicated at 69, there being one loaded switch for each delivery section. When switch SB is in the reversed position to that shown in FIG. 3 the circuit from the electrical supply is completed to the motor 60 and thus the motor 60 runs in the reverse direction to rewind the delivery sections 11a to 11e.

The loaded switches 69 are arranged to operate in sequence as each delivery section 11a to 11e of the belt 11 is fully rewound. When all the belt 11 is rewound to the starting position all the switches 69 will be open causing a break in the circuit to the motor 60, thus causing the motor 60 to stop.

The invention is not restricted to details of the foregoing example. For instance it will be appreciated that the linked pairs of rollers can be replaced by a chain and sprockets, the sprockets being mounted coaxially upon a single shaft.

Also it will be appreciated that the conveyor belt to the left of rollers 19, 21, 22 31–35, 30 as shown in FIG. 1 may be rotated clockwise through approximately 90° so that the overall length of the delivery sections 11a to 11e is increased.

This second embodiment of the dispensing apparatus in which all the delivery sections 11a to 11e are in a single plane will now be described with reference to FIGS. 4 and 5 of the drawings.

Referring to FIG. 4 there is shown the dispensing apparatus having a base 81, and a plurality of struts 80 carrying aluminum shelves 80a. The belt 11 passes over the shelves and a plurality of rollers to provide delivery sections 11a to 11e.

From a first anchorage point 97 the belt extends around the edge of the uppermost shelf and passes over rollers 96,95; 86; 94,93; 85; 92,91; 84; 90,89; 83; 88,87; 82; to drum 27 of motor 60, thereby forming delivery sections 11a to 11e.

The belt is driven in the same manner as the embodiment of FIG. 1 i.e. by the frictional engagement of the belt upon the drum. From the drum 27 the belt passes over the following rolls as best shown in FIG. 5 of the drawings i.e. 108,107; 112; 106,105; 111; 104,193; 110; 102,101; 109; 100,99; around the edge of the upper most shelf to a second anchorage point 98.

The sets of rollers for example 87,88, 107,108 etc., are contained within a link 79 mounted upon nylon runners and arranged to run along the respective aluminum shelves. The operation of this embodiment of the invention closely follows that previously described with respect to FIG. 1 of the drawings.

In use articles, such as loaves of bread 114 are placed are regular intervals on the delivery sections 11a to 11e. When the motor 60 is actuated by the insertion of a coin, the motor drives the first delivery section 11e in a direction shown by the arrow of FIG. 5 to dispense a loaf of bread. As the load falls from the delivery section 11e it strikes a plate 26a thereby operating a trip switch in link manner to that previously described to switch off the electric motor 60.

When the belt is driven the first link containing the rollers 87,88, 107,108 is drawn to the left as shown in FIGS. 4 and 5 to accommodate the length of belt which moves from left to right under the action of the drum of motor 60.

The link 79 will move to the left dispensing loaves from the first delivery section 11e until the guide 79 strikes a stop whereupon further operation of the motor 60 causes the link for the second delivery section 11d to operate. It will be appreciated that bread from all the shelves will be dispensed in turn whereupon the machine can be rewound to return the delivery sections to the original starting positions.

Also clips 115 may be provided beneath the aluminum shelves 80a to hold the loops of belt which are formed beneath the shelves and prevent them from hindering the path of the links 79.

The belt need not be continuous, for example the drum of the motor may be provided with two one-way windup rollers which are free running in one direction and in the other direction rotate in response to the shaft on which they are mounted. These one-way windup rollers may be mounted on opposite ends and in opposite senses on a shaft driven by motor 60. Upon one of the one-way rollers the belt 11 can be wound and unwound as desired whilst the second one-way windup roller could wind and unwind wire or cable thereby replacing the belt which goes around rollers 108, 107; 112; 106,105 etc., to anchorage point 98. This modification enables the overall amount of expensive belting required to be considerably reduced.

I claim:

1. In an apparatus for dispensing articles the combination of an elongate conveying member for conveying the articles to be dispensed, drive means engaging the conveying member between it s ends for driving the conveying member, anchoring means stationarily anchoring the conveying member at both ends, each conveying member passing under and over a plurality of support means, means including said support means, defining a plurality of delivery sections, said last-mentioned means allowing only one delivery section at a time to move to dispense articles, said support means including a first plurality of fixed and movable rotatable supports and a second plurality of fixed and movable rotatable supports and said conveying member, between a first one of said delivery sections and one end of the conveying member, passes under and over alternately said second plurality of fixed and movable rotatable supports, and said conveying member forms a loop between each of the remaining delivery sections, each of said loops passing around a respective one of the rotatable supports of said first plurality thereof, said apparatus further comprising means linking each of the rotatable supports of said second plurality with a respective movable rotatable support of said first plurality.

2. Apparatus as claimed in claim 1, wherein the conveying member is a canvas or nylon belt and the supports, rotatable smooth rollers.

3. In an apparatus for dispensing articles the combination of an elongate conveying member for the articles to be dispensed, a drive means for driving the conveying member, anchoring means stationarily for anchoring the conveying member at both ends said conveyor member being arranged to pass under and over a plurality of supports thereby providing a plurality of delivery sections such that only one delivery section at a time moves to dispense articles to be dispensed when the driving means drives the conveyor member which, between a first delivery section and one end, passes under and over a plurality of alternately fixed and movable rotatable supports and the conveyor member contains a loop passing over a respective rotatable support which is linked for movement with a respective one of the said movable rotatable supports and wherein each linked pair of rotatable supports is movable along a guide path provided by adjacent members, each pair of supports in turn traversing along its guide path in response to driving of the conveying member until a stop is reached whereupon another pair of rotatable supports traverses its guide path.

4. Apparatus as claimed in claim 3, further comprising a chute positioned to receive articles from the delivery sections, a conveyor-stopping means responsive to delivery of an article into the chute.

5. Apparatus as claimed in claim 3, wherein first and second switches are provided with the guide path associated with the last delivery section such that a corresponding last pair of rotatable supports operates the first switch to override the action of the stopping means until the last article has been delivered and such that the said last pair of supports subsequently operates the said second switch thereby stopping the movement of the conveyor member.

6. Apparatus as claimed in claim 5, wherein the second switch is positioned before the stop for the guide path associated with the last delivery section so that the second switch is operated by the supports before the stop is reached.

* * * * *